(12) United States Patent
Boaz

(10) Patent No.: US 7,694,532 B1
(45) Date of Patent: Apr. 13, 2010

(54) SYSTEM AND METHOD FOR TEMPERING GLASS CONTAINERS

(76) Inventor: Premakaran T. Boaz, 16842 Yorkshire, Livonia, MI (US) 48154

( * ) Notice: Subject to any disclaimer, the term of this patent is extended or adjusted under 35 U.S.C. 154(b) by 11 days.

(21) Appl. No.: 10/982,444

(22) Filed: Nov. 5, 2004

Related U.S. Application Data

(63) Continuation-in-part of application No. 10/247,386, filed on Sep. 19, 2002, now Pat. No. 6,826,929.

(60) Provisional application No. 60/517,768, filed on Nov. 6, 2003.

(51) Int. Cl.
- *C03B 27/00* (2006.01)
- *C03B 27/04* (2006.01)
- *C21D 1/00* (2006.01)
- *C21D 1/04* (2006.01)
- *C21D 1/10* (2006.01)

(52) U.S. Cl. .............. 65/114; 65/115; 65/348; 65/350; 148/570; 148/574

(58) Field of Classification Search .............. 65/114, 65/115, 348, 349, 40, 111; 148/570, 574
See application file for complete search history.

(56) References Cited

U.S. PATENT DOCUMENTS

| | | | | |
|---|---|---|---|---|
| 1,951,950 A | * | 3/1934 | Rising | 65/114 |
| 1,981,560 A | * | 11/1934 | Littleton | 65/115 |
| 2,068,799 A | * | 1/1937 | Guyer | 65/115 |
| 2,178,520 A | * | 10/1939 | Howard | 65/115 |
| 2,254,227 A | * | 9/1941 | Lewis | 65/115 |
| 2,375,944 A | * | 5/1945 | Quentin | 65/115 |
| 2,390,910 A | * | 12/1945 | Aksomitas | 65/114 |
| 2,428,969 A | * | 10/1947 | Guyer | 219/383 |
| 2,556,236 A | * | 6/1951 | Strickland, Jr | 148/570 |
| 2,556,243 A | * | 6/1951 | Vaughan | 148/570 |
| 2,695,475 A | * | 11/1954 | Ellis | 65/116 |
| 2,902,575 A | * | 9/1959 | Guyer | 219/383 |
| 3,406,022 A | * | 10/1968 | Gehenot | 65/114 |
| 3,608,766 A | * | 9/1971 | D'Orefice | 215/374 |

(Continued)

FOREIGN PATENT DOCUMENTS

WO    WO 02/051785 A2 *   7/2002

OTHER PUBLICATIONS

Zinn, S., Semiatin, S.L., "Coil Design and fabrication: part 2, specialty coils", Heat Treating, Aug. 1988, pp. 29-32.*

(Continued)

*Primary Examiner*—Jason L. Lazorcik
(74) *Attorney, Agent, or Firm*—Bliss McGlynn, P.C.

(57) ABSTRACT

A system and method is provided for tempering a glass container. The method includes the steps of pre-heating the glass container to a first predetermined temperature. The method also includes the steps of applying radio-frequency energy to the pre-heated glass container to heat the glass container to a second predetermined temperature and, after a predetermined amount of time, simultaneously cooling at least one surface of the heated glass container to a third predetermined temperature to treat the glass container. The method further includes the steps of, after a predetermined amount of time, quenching the treated glass container to a fourth predetermined temperature to produce a tempered glass container.

11 Claims, 2 Drawing Sheets

U.S. PATENT DOCUMENTS

| | | | | |
|---|---|---|---|---|
| 3,938,980 | A * | 2/1976 | French | 65/114 |
| 4,375,997 | A * | 3/1983 | Matz | 148/570 |
| 4,401,485 | A * | 8/1983 | Novorsky | 148/571 |
| 4,468,010 | A * | 8/1984 | Novorsky | 266/123 |
| 4,531,987 | A * | 7/1985 | Pfaffmann et al. | 148/571 |
| 4,625,090 | A * | 11/1986 | Pfaffmann et al. | 219/644 |
| 4,628,167 | A * | 12/1986 | West | 219/644 |
| 4,785,147 | A * | 11/1988 | Mucha et al. | 219/640 |
| 4,786,772 | A * | 11/1988 | Umemoto et al. | 219/643 |
| 4,900,984 | A | 2/1990 | Iton et al. | |
| 5,322,542 | A * | 6/1994 | Ogata et al. | 65/102 |
| 5,414,246 | A * | 5/1995 | Shapona | 219/640 |
| 5,782,947 | A | 7/1998 | Boaz | |
| 5,827,345 | A * | 10/1998 | Boaz et al. | 65/104 |
| 6,000,244 | A | 12/1999 | Boaz | |
| 6,270,595 | B1 * | 8/2001 | Takayama et al. | 148/570 |
| 6,408,649 | B1 | 6/2002 | Sklyarevich et al. | |
| 6,821,363 | B1 * | 11/2004 | Leissner et al. | 148/570 |
| 6,826,929 | B2 * | 12/2004 | Boaz | 65/114 |
| 7,367,205 | B1 * | 5/2008 | Boaz | 65/349 |
| 2002/0162610 | A1 | 11/2002 | Shrout et al. | |

OTHER PUBLICATIONS

"Radio Frequency" from (http://en.wikipedia.org/wiki/Radio_frequency, Accessed Aug. 27, 2008).*

* cited by examiner

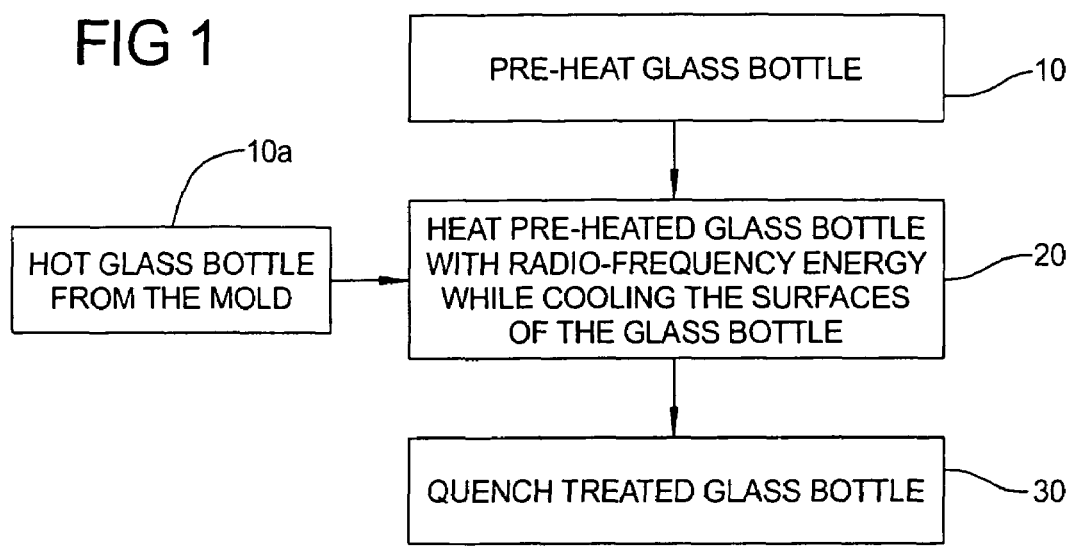
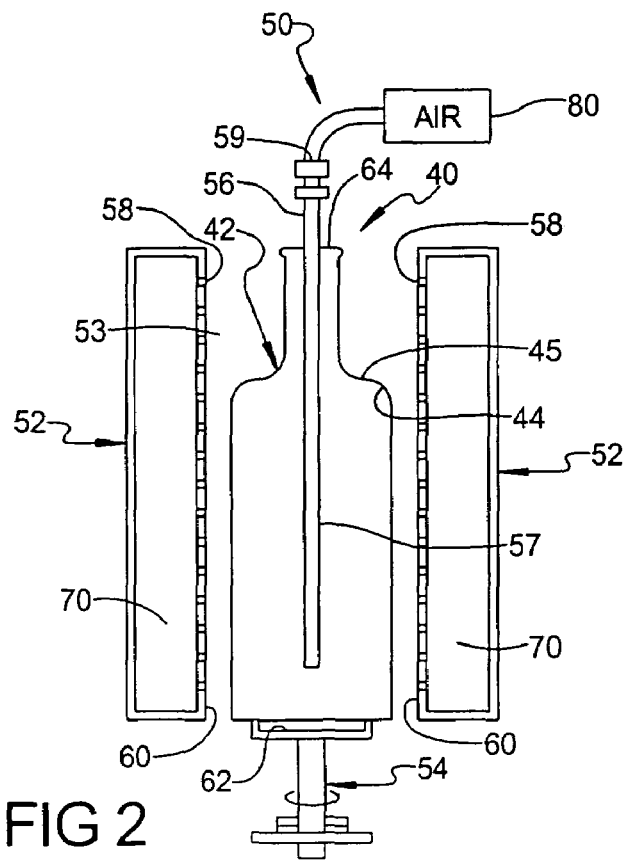

SYSTEM AND METHOD FOR TEMPERING GLASS CONTAINERS

CROSS-REFERENCE TO RELATED APPLICATION

The present application claims the priority date of copending U.S. Provisional Patent Application Ser. No. 60/517,768, filed Nov. 6, 2003, and is a continuation-in-part of U.S. patent application Ser. No. 10/247,386, filed Sep. 19, 2002, now U.S. Pat. No. 6,826,929 and entitled "System and Method for Simultaneously Heating and Cooling Glass to Produce Tempered Glass."

BACKGROUND OF THE INVENTION

1. Field of the Invention

The present invention relates generally to glass containers and, more particularly, to a system and method for tempering glass containers such as bottles, tumblers, and jars.

2. Description of the Related Art

Tempered glass is generally defined as glass (e.g., annealed or ordinary) that has been pre-stressed by heating it to a temperature at or above its softening point and forcing the glass to suddenly and rapidly quench under carefully controlled conditions. This tempering process produces tempered glass, which has highly desirable conditions of induced stress that result in additional strength, resistance to thermal stress, and impact-resistance, as compared to annealed or ordinary glass.

The basic principle employed in the tempering process is to create an initial condition of surface- and edge-compression. This condition is achieved by first heating the glass and then quenching the surfaces thereof rapidly. Such heating and quenching leaves the center of the glass relatively hot compared to the surfaces thereof. As the center then cools, the surfaces and edges of the glass are forced into compression. Wind pressure, missile impact, thermal stresses, or other applied loads must first overcome the compression before there is any possibility of fracture to the glass.

With respect to the heating step, it is known to use a hearth or lehr to heat glass that is to be tempered. Generally speaking, the lehr is a furnace and may be of a continuous-roller type, fixtured-roller type, or gas type. For example, a gas-type lehr has a plurality of blocks disposed beneath a plurality of radiant heaters. Typically, the glass is placed inside the lehr, where the glass is heated by conventional radiation and convection and conduction heat. The glass is moved along the blocks at a predetermined rate, which depends upon the thermal conductivity of the glass, to reach a temperature in the forming range of the glass. When the glass is at a temperature in such range (e.g., approximately 1200° F.), the glass is formed into a predetermined shape of the blocks.

Once so formed, the surfaces of the glass are rapidly air-quenched, typically by application of an air stream thereto, thus creating a desired temperature differential or gradient between the center of the glass and the surfaces thereof to create a desired internal stress. The air stream can consist of arrays of fixed, reciprocating, or rotating nozzles. It is important to extract heat uniformly from all surfaces of the glass (uneven heat extraction may produce bow or warp) and to sustain the quench long enough to prevent reheating of the surfaces from the still-hot center of the glass. A quenched condition becomes stable when the glass is reduced to a temperature of approximately 400-600° F.

In the case of tempering glass containers such as glass bottles, however, the conventional tempering process just described is not practical. More specifically, known mechanisms designed and employed to quench the surfaces of the glass container do not sufficiently quickly quench the surfaces such that a desired temperature differential or gradient between the center of the glass walls and the surfaces thereof to create the desired internal stress is not created.

Therefore, there is a need in the art for a system and method for tempering glass containers, in general, and a system and a method for heating glass containers during the heating portion of the tempering process while maintaining a desired temperature differential or gradient between the center of the glass walls of the containers and the surfaces thereof to create the required internal stress, in particular. There is also a need in the art for a system and method that tempers glass containers such as bottles rapidly, efficiently, and inexpensively.

SUMMARY OF THE INVENTION

Accordingly, the present invention is a system and method for tempering a glass container. The method includes the steps of pre-heating the glass container to a first predetermined temperature. The method also includes the steps of applying radio-frequency energy to the pre-heated glass container to heat the glass container to a second predetermined temperature and, after a predetermined amount of time, simultaneously cooling at least one surface of the heated glass container to a third predetermined temperature to treat the glass container. The method further includes the steps of, after a predetermined amount of time, quenching the treated glass container to a fourth predetermined temperature to produce a tempered glass container.

In addition, the present invention is a system for tempering a glass container that includes a plurality of plates spaced relative to each other to apply radio-frequency energy to a pre-heated glass container to heat the glass container to a predetermined temperature. The system also includes a spindle adapted to support and transport the glass container between the plates. The system further includes a quench tube including a portion adapted to be disposed inside of the glass container, wherein the quench tube is adapted for air to pass therethrough and into the glass container to thereby quench the glass container and produce a tempered glass container.

One advantage of the present invention is that a system and method is provided for tempering glass containers. Another advantage of the present invention is that the system and method heats glass containers during the heating portion of the tempering process while maintaining a desired temperature differential or gradient between the center of the glass of the containers and the surfaces thereof to create the required internal stress. Yet another advantage of the present invention is that the system and method tempers glass containers rapidly, efficiently, and inexpensively. Still another advantage of the present invention is that the system and method produces glass containers that are lighter, stronger, and more impact-resistant. A further advantage of the present invention is that the system and method conserves raw materials and energy in manufacturing glass containers.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a flowchart of a method, according to the present invention, for tempering a glass container.

FIG. 2 is a fragmentary elevational view of a system, according to the present invention, for tempering a glass container.

DESCRIPTION OF THE PREFERRED EMBODIMENT(S)

Figure 3:
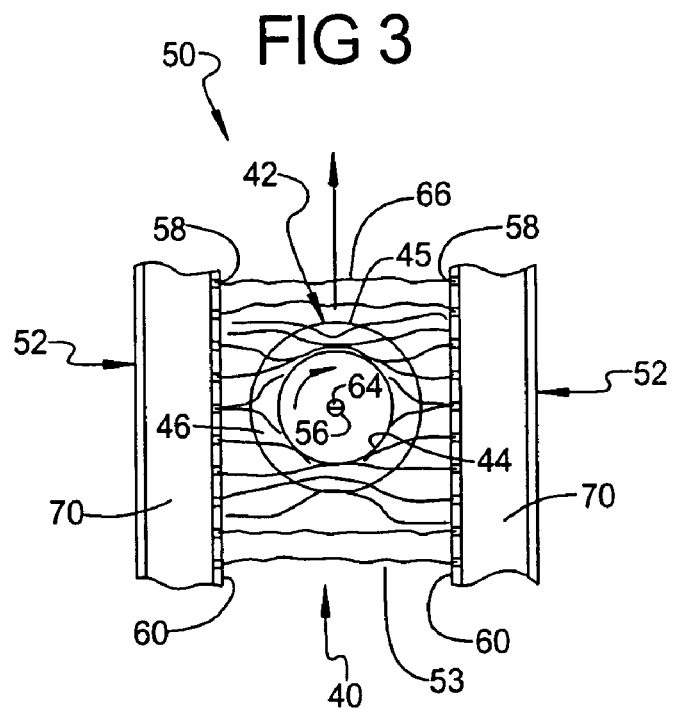
FIG. 3 is a fragmentary plan view of the system for tempering a glass container of FIG. 2.

Referring to FIG. 1, one embodiment of a method, according to the present invention, is shown for tempering a glass container. The method includes first, second, and third steps, 10, 20, 30, respectively. The method can be employed in tempering any suitable glass container such as a bottle, tumbler, or jar. In the system and method shown in the figures and described below, a glass bottle 40 is tempered as shown in FIGS. 2 and 3. However, it should be appreciated that the system and method can be used in connection with any suitable glass container or object. It should be appreciated that the glass, generally indicated at 42, of the bottle 40 is illustrated in FIGS. 2 and 3. It should also be appreciated that the glass 42 of the bottle 40 illustrated defines two major surfaces, namely an inner surface 44 and an outer surface 45, but the glass container could include any suitable number and shape of major surfaces.

The method includes a first step 10a of receiving a hot glass bottle, generally indicated at 40 in FIGS. 2 and 3, from a mold (not shown) or step 10b of pre-heating the glass bottle 40 to a first predetermined temperature. This pre-heating can be accomplished in any number of conventional ways, including heating with infrared energy. In one embodiment, the first predetermined temperature falls within a range of about 900° F. to about 990° F. It should be appreciated that the glass, generally indicated at 42, of the bottle 40 is illustrated.

The method also includes a second step 20 of applying radio-frequency energy to the pre-heated glass bottle 40 to heat it to a second predetermined temperature. In one embodiment, the radio-frequency energy has a frequency falling within the range of about 0.01 GHz to about less than 0.2 GHz. Also, in one embodiment, the second predetermined temperature falls within a range of about 1150° F. to about 1250° F. After a predetermined amount of time, the second step 20 includes cooling at least one, preferably both of the surfaces 44 and 45 of the heated glass bottle 40 to a third predetermined temperature to treat the glass bottle 40. In one embodiment, the third predetermined temperature falls within a range of about 600° F. to 1150° F. This cooling can be accomplished in any number of conventional ways. For example, at least one, and preferably, a plurality of air streams are directed toward at least one, and preferably, a plurality of the surfaces 44, 45 of the heated glass bottle to cool the at least one surface 44,45. In one embodiment, each of the major surfaces of the glass 42, such as the inner surface 44 and outer surface 45, are cooled during the second step 20. The purpose of the cooling of the inner and outer surfaces 44, 45 is to maintain a desired temperature differential or gradient between a center 46 of the glass 42, shown in FIG. 3, and the surfaces 44, 45 of the glass 42, with the center 46 having a higher temperature than that of the surfaces 44,45.

The method further includes a third step 30 of quenching the treated glass bottle 40 to a fourth predetermined temperature to produce a tempered glass bottle 40. In one embodiment, the fourth predetermined temperature falls within a range of about 400° F. to 600° F. This quenching can be accomplished in any number of conventional ways. One such way is to apply at least one, and preferably, a plurality of air streams to the treated glass bottle 40, preferably directed at the inner and outer surfaces 44, 45 thereof. After the quenching process, the quenched glass bottle 40 can be further cooled, for example, to room temperature.

Referring to FIGS. 2 and 3, one embodiment of a system 50, according to the present invention, for use in conjunction with the method of the present invention for tempering a glass bottle 40, is shown. The system 50 includes a plurality of plates 52 that are adapted to radiate radio-frequency energy, a spindle, generally indicated at 54, and a quench tube 56. The system 50 will now be described in detail.

The system 50 shown in FIGS. 2 and 3 includes a pair of radiation plates 52 that are substantially identical and spaced relative to each other in a substantially aligned and parallel fashion. The plates 52 are spaced horizontally with the glass bottle 40 disposed between the plates 52 as illustrated in FIGS. 2 and 3. The spaced position of the plates 52 defines an elongate passage 53 between the plates 52, as illustrated in FIG. 3, in which the glass bottle 40 can be disposed.

The system 50 also includes a plurality of hollow plenums 70 that are each supplied with air under positive pressure and adapted to supply air to the glass bottle 40. In the embodiment shown, each radiation plate 52 is hollow and includes one of the plenums 70. Each of the radiation plates 52 is also of a substantially rectangular shape. Each of the radiation plates 52 includes a plurality of air-outlet holes 58 disposed substantially equidistantly from each other on an inside surface 60 of the radiation plate 52 for supplying air to the glass bottle 40 in a manner to be described.

The spindle 54 is disposed centrally between the radiation plates 52. The spindle 54 includes a surface 62 that is adapted to support the glass bottle 40. The surface 62 is substantially flat or planar. The spindle 54 is also adapted to transport the glass bottle 40 relative to the radiation plates 52. For instance, in the embodiment shown, the spindle 54 is adapted to continuously spin the glass bottle 40 and to move the glass bottle 40 along the passage 53 defined between the radiation plates 52. Preferably, the surface 62 is disposed in a substantially perpendicular fashion to the inside surface 60 of each of the radiation plates 52 and such that substantially the entire glass bottle 40 is disposed between the radiation plates 52.

The quench tube 56 includes a portion 57 adapted to be disposed through an opening 64 of the glass bottle 40 and extend inside of the glass bottle 40. The quench tube 56 also includes an opposite end 59 that is connected to a source of air 80 from an air-supply system (not shown). It should be appreciated that the portion 57 of the quench tube 56 disposed inside the glass bottle 40 has an opening 60 to allow air to pass therethrough and into the glass bottle 40. It should also be appreciated that the quench tube 56 is adapted for air to pass therethrough and into the glass bottle 40 to thereby quench the glass bottle 40 and produce a tempered glass bottle 40.

In operation, the glass bottle 40 is pre-heated to the first predetermined temperature, such as about 550° C. Then, the pre-heated glass bottle 40 is loaded onto the surface 62 of the spindle 54, and the quench tube 56 is connected to the source of air 80 and the portion 57 of the quench tube 56 is inserted into the pre-heated glass bottle 40. Then, the spindle 54 transports the pre-heated bottle 40 between the radiation plates 52 and through the passage 53 defined by the radiation plates 52 as the radiation plates 52 apply radio-frequency energy to the pre-heated glass bottle 40. The radio-frequency energy heats the glass bottle 40 to the second predetermined temperature. Simultaneously, the spindle 54 continuously spins the pre-heated glass bottle 40 to provide uniform radiation and, thus, heating to the glass bottle 40. As illustrated in FIG. 3, radio waves, represented at 66, travel through the surfaces 44,45 of the glass bottle 40.

Then, after a predetermined amount of time, the surfaces 44, 45 of the heated glass bottle 40 are simultaneously cooled to a third predetermined temperature to treat the glass bottle 40. More specifically, air is supplied to each of the plates 52 and the quench tube 56 and, consequently, through the holes 58 and opening 60 to the inner and outer surfaces 44, 45 of the heated glass bottle 40 while the radio waves 66 are applied to the pre-heated glass bottle 40.

A desired temper level is determined at this point by the temperature differential or gradient between the center 46 of the glass 42 and the surfaces 44,45 of the glass 42, with the center 46 having a higher temperature than that of the surfaces 44,45.

Finally, after a predetermined amount of time, the treated glass bottle 40 is quenched to a fourth predetermined temperature to produce a tempered glass bottle 40. More specifically, application of the radio waves 66 is discontinued while supply of air through the holes 58 and quench tube 56 is continued. If required, the tempered glass bottle can be removed from the surface 62 of the spindle 54 for additional cooling.

Figure 4:
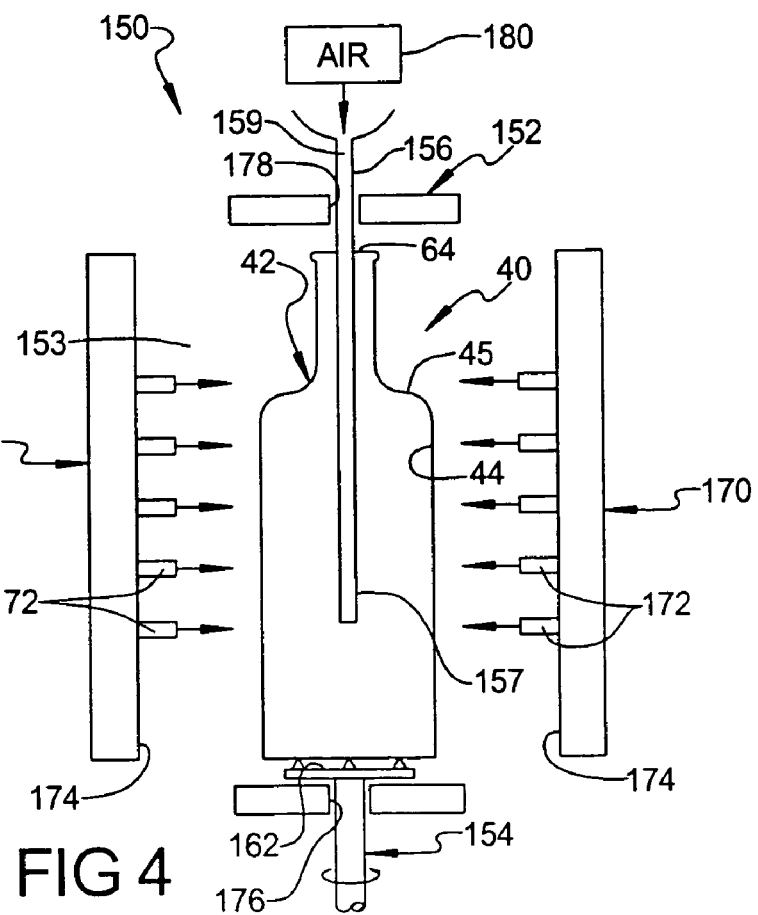
FIG. 4 is another embodiment, according to the present invention, of the system of FIG. 2 for tempering a glass container.

Referring to FIG. 4, another embodiment, according to the present invention, of the system 50 is shown. Like parts of the system 50 have like reference numerals increased by one hundred (100). In this embodiment, the system 150 includes a plurality, preferably a pair of plates 152 that are adapted to radiate radio-frequency energy, a spindle 154, and a quench tube 156. In the embodiment illustrated, the pair of radiation plates 152 are substantially identical and spaced relative to each other in a substantially aligned and parallel fashion. The radiation plates 152 are spaced vertically with the glass bottle 40 disposed between the plates 152 as shown in FIG. 4. One of the radiation plates 152 is disposed above the glass bottle and the other of the radiation plates 152 is disposed below the glass bottle 40. One of the radiation plates 152 includes a slot opening 176, and the other radiation plate 152 includes another slot opening 178.

The system 150 further includes a plurality of hollow plenums 170. In the embodiment illustrated, there are a pair of plenums 170 that are substantially identical and spaced relative to each other in a substantially aligned and parallel fashion. The plenums 170 are spaced horizontally with the glass bottle 40 disposed between the plenums 170 as shown in FIG. 4. One of the plenums 170 is disposed on one side of the glass bottle 40 and the other of the plenums 170 is disposed on the other side of the glass bottle 40. Each of the plenums 170 is supplied with air under positive pressure and is adapted for supplying air to the glass bottle 40. Each of the plenums 170 is also of a substantially rectangular shape and includes a plurality of air nozzles or tubes 172 disposed substantially equidistantly from each other on an inside surface 174 of the plenums 170. The air tubes 172 are inserted and removed by a cam arrangement (not shown). The spaced position of the plenums 170 and the plates 152 defines an elongate passage 153 between the plenums 170 and plates 152 in which the glass bottle 40 can be disposed. It should be appreciated that the air tubes 172 blow air on the sides of the glass bottle 40.

The spindle 154 is disposed between the radiation plates 152. The spindle 154 includes a surface 162 that is adapted to support and transport the glass bottle 40 within the space defined between the radiation plates 152. The surface 162 is substantially planar or flat. The spindle 154 is also adapted to continuously spin the glass bottle 40 and move the glass bottle 40 through the passage 153. In the embodiment illustrated, the spindle 154 extends through the slot opening 176 in the lower radiation plate 152. Preferably, the surface 162 is disposed in a substantially perpendicular fashion to the inside surface 174 of each of the plenums 170 and such that substantially the entire glass bottle 40 is disposed between the plenums 170.

The quench tube 156 includes a portion 157 adapted to be disposed through the slot opening 178 in the upper radiation plate 152, through an opening 64 of the glass bottle 40, and inside the glass bottle 40. The quench tube 156 also includes an opposite end 159 that is connected to a source of air 180. The operation of the system 150 is similar to the system 50.

Accordingly, the system 50, 150 and method of the present invention tempers glass containers, in general, and heats glass bottles 40 during the heating portion of the tempering process while maintaining a desired temperature differential or gradient between the center of the glass 42 of the bottles 40 and the surfaces 44, 45 thereof to create the required internal stress, in particular. The system 50, 150 and method of the present invention also tempers glass containers rapidly, efficiently, and inexpensively. The system 50, 150 and method of the present invention also produces glass containers that are lighter, stronger, and more impact-resistant. The system 50, 150 and method of the present invention also conserves raw materials and energy in manufacturing glass containers.

The present invention has been described in an illustrative manner. It is to be understood, that the terminology that has been used, is intended to be in the nature of words of description rather than of limitation.

Many modifications and variations of the present invention are possible in light of the above teachings. Therefore, the present invention may be practiced other than as specifically described.

What is claimed is:

1. A system for tempering a glass container comprising:
a radio-frequency energy source having a plurality of substantially rectangular plates vertically orientated and horizontally spaced relative to each other to apply radio-frequency energy to a pre-heated glass container to heat the glass container to a predetermined temperature, wherein the glass container receives the radio-frequency energy and the radio-frequency energy heats the glass container to the predetermined temperature;
a spindle adapted to support and transport the glass container between said plates;
a quench tube including a portion adapted to be disposed inside of the glass container, said quench tube adapted for allowing air to pass therethrough and into the glass container to thereby quench the glass container and produce a tempered glass container; and
wherein each of said plates includes a plurality of air-outlet holes spaced vertically from each other on an inside surface of said radiation plate for supplying air to an outside surface of the glass container.

2. A system as set forth in claim 1 including a plurality of plenums supplied with air under positive pressure, each of said plenums adapted to supply air to the glass container.

3. A system as set forth in claim 2 wherein said plenums are spaced horizontally so as to define a passage between said plenums in which the glass container can be disposed.

4. A system as set forth in claim 2 wherein each of said plates includes one of said plenums.

5. A system as set forth in claim 2 wherein said plenums are spaced horizontally and said plates are spaced vertically so as to define a passage between said plenums and said plates in which the glass container can be disposed.

6. A system as set forth in claim 1 wherein said spindle is adapted to spin the glass container.

7. A system as set forth in claim 1 wherein said plates define a passage and said spindle is adapted to move the glass container through said passage.

8. A system as set forth in claim 1 wherein at least one of said plates includes a slot opening.

9. A system as set forth in claim 8 wherein said quench tube extends through said slot opening.

10. A system as set forth in claim 8 wherein said spindle extends through said slot opening.

11. A system for tempering a glass container comprising:

a radio-frequency energy source having a plurality of substantially rectangular radiation plates vertically orientated and horizontally spaced relative to each other to apply radio-frequency energy to a pre-heated glass container to heat the glass container to a predetermined temperature;

a plurality of plenums supplied with air under positive pressure, each of said plenums including a plurality of air nozzles disposed on an inside surface thereof and spaced vertically from each other for allowing air to pass therethrough to cool an outside surface of the heated glass container to cool the glass container;

a spindle adapted to support and transport the glass container between said plates; and a tube including a portion adapted to be disposed inside of the glass container, said tube adapted for allowing air to pass therethrough to an inside surface of the heated glass container to cool the glass container.

* * * * *